(12) United States Patent
Clarke et al.

(10) Patent No.: US 7,752,241 B1
(45) Date of Patent: Jul. 6, 2010

(54) MESSAGE BASED FILE SYSTEM

(75) Inventors: Kevin J. Clarke, Princeton, MA (US);
Robert Gittins, Divide, CO (US);
Richard S. Brown, Frankfort, IL (US)

(73) Assignee: Oracle America, Inc., Redwood City, CA (US)

( * ) Notice: Subject to any disclaimer, the term of this patent is extended or adjusted under 35 U.S.C. 154(b) by 661 days.

(21) Appl. No.: 10/994,740

(22) Filed: Nov. 22, 2004

(51) Int. Cl.
*G06F 12/00* (2006.01)
*G06F 17/30* (2006.01)

(52) U.S. Cl. .................. 707/822; 707/827; 709/200

(58) Field of Classification Search ............ 707/1, 707/2, 100; 709/989; 710/100
See application file for complete search history.

(56) References Cited

U.S. PATENT DOCUMENTS

| | | | | |
|---|---|---|---|---|
| 5,434,974 | A * | 7/1995 | Loucks et al. ............ | 707/101 |
| 6,044,367 | A * | 3/2000 | Wolff ...................... | 707/2 |
| 6,385,701 | B1 * | 5/2002 | Krein et al. ............. | 711/141 |
| 6,556,998 | B1 * | 4/2003 | Mukherjee et al. ....... | 707/10 |
| 6,925,515 | B2 * | 8/2005 | Burns et al. ............ | 710/200 |
| 6,999,607 | B2 * | 2/2006 | Kiros et al. ............ | 382/128 |
| 7,010,583 | B1 * | 3/2006 | Aizono et al. .......... | 709/219 |
| 7,287,180 | B1 * | 10/2007 | Chen et al. ............. | 714/4 |
| 2002/0065810 | A1 * | 5/2002 | Bradley ................. | 707/2 |
| 2003/0074374 | A1 * | 4/2003 | Karibe et al. .......... | 707/104.1 |
| 2003/0149819 | A1 * | 8/2003 | Smith et al. ........... | 710/100 |
| 2003/0204672 | A1 * | 10/2003 | Bergsten ................ | 711/114 |
| 2004/0236798 | A1 * | 11/2004 | Srinivasan et al. ..... | 707/200 |
| 2005/0055575 | A1 * | 3/2005 | Evans et al. ........... | 713/201 |
| 2005/0273486 | A1 * | 12/2005 | Keith, Jr. .............. | 709/200 |
| 2006/0041644 | A1 * | 2/2006 | Henseler ............... | 709/220 |
| 2007/0101069 | A1 * | 5/2007 | Corbett et al. ......... | 711/141 |

OTHER PUBLICATIONS

Leach et al., "CIFS: A Common Internet File System," http://www.microsoft.com/mind/1196/cifs.asp., Nov. 1996, (11 pages).
Suh et al., "Design, Automation, and Test in Europe," Proceedings of the Conference on Design, Automayion and Test in Europe—vol. 2, IEEE Computer Society, 2004, (13 pages).

* cited by examiner

*Primary Examiner*—Cam Y Truong
*Assistant Examiner*—Dung K Chau
(74) *Attorney, Agent, or Firm*—Robert C Kowert; Meyertons, Hood, Kivlin, Kowert & Goetzel, P.C.

(57) ABSTRACT

File system components of a messaged based file system may perform different functions of the file system and may communicate through a file system-independent message interface to fulfill file I/O naming requests. A file system component may receive a message from another file system component and in response may perform a sub-function of the file system and then may send another message to a file system component to perform another function of the file system. File system components may each operate on separate devices or multiple file system components may execute on a single device. File system components may also communicate using messaging components that in turn may communicate with other messaging components according to the file system-independent message interface. A single messaging component may be configured to communicate with multiple file system components on a single device. Alternatively, each file system component may communicate through a single, paired messaging component.

68 Claims, 9 Drawing Sheets

MESSAGE BASED FILE SYSTEM

BACKGROUND OF THE INVENTION

1. Field of the Invention

This invention relates to file systems in general and more particularly to distributed file systems.

2. Description of the Related Art

A file system is a method for storing and organizing files to make it easy to find and access the data stored in those files. Traditionally, file systems have been implemented using a single piece of software performing all functions of organizing and keeping track of files in the file system. Such file system software generally has to be capable of resolving naming issues, authenticating client users/applications, loading and storing data to physical storage devices, and any other task related to the file system. File system software is frequently included as part of an operating system to allow applications of the operation system to access data files. Hierarchical file systems allow applications to store and group data files in directories using a tree structure. Generally, file system software is implemented as a single, discrete, piece of software and the files managed by the file system software are typically stored on a single storage device, such as a hard-drive, frequently connected directly to the machine executing the file system software. The different operations of the file system software are typically implemented as different functions in the file system software. Communication between different functions of file system software is generally performed using direct function calls using file system specific parameters.

SUMMARY

A messaged based file system may be implemented using file system components, according to various embodiments. Different file system components may perform different functions or sub-functions of the message based file system, in some embodiment. For example, one file system component may perform a name resolution function, while another file system component may perform a security or authentication function, in one embodiment. The various file system components that make up a message based file system may communicate through a file system-independent message interface. For example, in one embodiment, a first file system component may receive a client application's file I/O request and may send a file system-independent message to a security file system component to authenticate the client application. The security file system component may authenticate that the client application may access the requested file and may, in some embodiments, send a response message through the file system-independent message interface to the first file system component indicating the successful authentication of the client application. After receiving the response from the security component, the first file system component may then send a message to another file system component to complete the client application's requested file I/O.

In one embodiment, a single main file system component may manage the fulfillment of the entire file I/O request by sending and receiving messages to various other file system components as needed. In other embodiments however, the various file system components may send messages regarding the requested file I/O to each other without requiring a single component to manage the process. For example, a first file system component may receive the file I/O request and send a file system-independent message to a naming file system component that in turn may send a message to a storage file system component and only send a response back to the first file system component after receiving the response from the storage file system component. Thus, file system components may function in a chain to fulfill a file I/O request, or one file system component may send messages to each file system component in turn, according to different embodiments. In other embodiments, a combination of these schemes may be used. In some embodiments, each file system component may execute on a separate device, while in other embodiments, multiple file system components may execute on a single device.

In certain embodiments, file system components may communicate using messaging components. In such embodiments, the messaging components may communicate with other messaging components according to a file system-independent message interface. Each messaging component may also communicate with a file system component. In one embodiment, a single messaging component may be configured to communicate with multiple file system components on a single device, while in other embodiments, each file system component may communicate through a separate messaging component, even if multiple file system components and multiple messaging components execute on a single device. A message based file system may implement any of various kinds of file systems and may use the same file system-independent message interface regardless of the specific underlying file system structure.

In some embodiments, file system components may be distributed on different computers or devices on a network and may communicate with each other over the network according to a file system-independent message interface. In one embodiment, a message based file system may utilize a file system-independent message interface and may thus avoid using programmatic interface, such as remote procedure calls (RPCs) and direct function calls. In one embodiment, the file system-independent message interface may use a non-programmatic interface or message format, such as including data representations of what would otherwise be code-based or programmatic system parameters.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
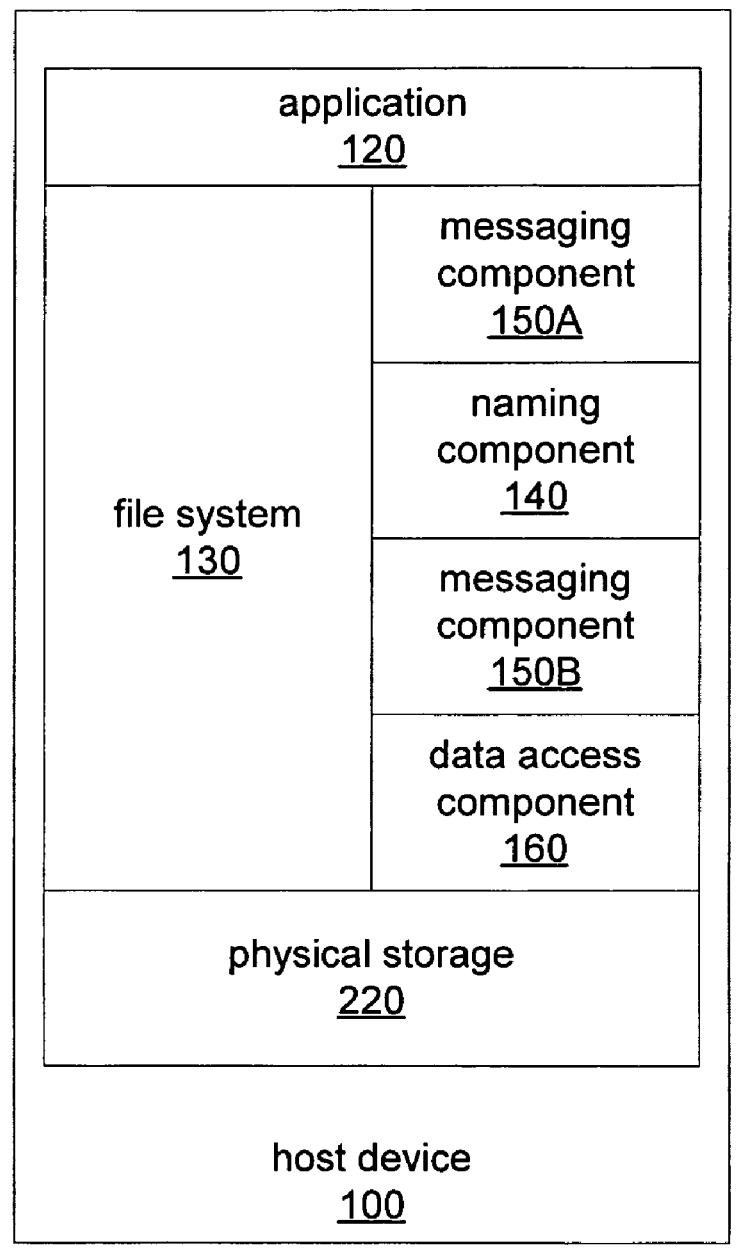
FIG. 1 is a block diagram illustrating an exemplary system for implementing a message based file system, according to one embodiment.

FIG. 1 is a block diagram that illustrates a computer system implementing a message based file system, according to one embodiment. In such an embodiment, host computer 100 may implement a message based file system, such as file system 130, that may include various file system components, such as naming component 140 and data access component 160. In such an embodiment, naming component 140 may provide a name resolution function for file system 130 and data access component 160 may provide data loading and storing to and from physical storage 220. For instance, application 120 may request data from a file on physical storage 220 by communicating to file system 130. To fulfill application 120's file I/O request, file system 130 may communicate with naming component 140 through a file system-independent message interface. The use of a file system-independent message interface allows file system 130 to communicate with different file system components, such as naming component 140 and data access component 160, without using different message interface specific to each file system component. In one embodiment, a file system-independent message interface may be implemented through a separate, distinct, software module or library. When the file system-independent message interface is utilized through a separate software library, individual file system components may, in one embodiment, be developed separately from other file system components.

A message based file system may be implemented compatible with any of a number of current file systems including, but not limited to, Unix File System, DOS, Windows File System, and Network File System, according to various embodiments. A message based file system may be implemented, in one embodiment, by dividing up an existing file system standard and distributing various functions or operations compatible with the existing file system standard into different file system components of the message based file system. For instance, in one embodiment, a message based file system compatible with the Unix file system may include one file system component to implement the name resolution requirements of the Unix file system while including another file system component, possible executing on a separate computer or device, to perform client authentication and other security operations according to the Unix file system standards. Since, according to some embodiments, the different file system components may communicate through a file system-independent message interface, different file system components compatible with different existing file system standards may communicate and cooperate efficiently together in a message based file system.

Since, according to some embodiments, file system components communicate according to a file system-independent message interface, a message based system may easily include file system components compatible with multiple existing file system standards. For instance, in one embodiment, a message based file system may include file system components compatible with the Unix file system and also include file system components compatible with Network File System.

In some embodiments, as illustrated in FIG. 1, a message based file system, such as file system 130, may also include one or more messaging components, such as messaging component(s) 150. A messaging component may communicate with other messaging components using a file system-independent message interface and may also communicate with one or more file system components, according to various embodiments. For example, as illustrated in FIG. 1, file system 130 may send a message to messaging component 150A including information regarding a file I/O request from application 120. Messaging component 150A may then forward part or all of the information from file system 130 to naming component 140 and may return a response from naming component 140 to file system 130, according to one embodiment.

Additionally, if the name resolution function performed by naming component 140 was successful, file system 130 may then send a message to messaging component 150B and messaging component 150B may supply some or all of the information in that message to data access component 160, and data access component 160 may then perform actual data loading or storing from or to physical storage 220, according to certain embodiments. For instance, application 120 may issue a file read request to file system 130. The actual mechanism used by application 120 to issue such a file I/O request may vary from embodiment to embodiment. For example, in one embodiment, application 120 may call a specific function from an API exposed by file system 130. When making a file read request, application 120 may, in certain embodiments, reference a file name or path. File system 130, may then send a message to naming component 140, possibly using messaging component 150A, in order to translate the file name or path specified by application 120 into a specific location on physical storage 220 where the data for that file resides, according to one embodiment.

According to some embodiments, file systems components of a message based file system communicate through a file system-independent message interface. In one embodiment, such a message interface may include different message definitions for different functions, while in other embodiments, a single message format may be used that includes information enabling any file system component to perform whatever function or sub-function required. For example a message format that includes all the relevant information regarding a requested file I/O and that also includes information indicating the current status of each step or function of the file I/O may be passed around among the various file system components.

For instance, in one such embodiment, a message sent by file system 130 may include the file name or path and a request for name resolution regarding physical storage 220. Yet in other embodiments, such a message may also include information indicating the current status of name resolution, authentication, encryption, or data access functions of the file system, among other things. Thus rather than using file system specific parameters or messages, a message based file system may use a file system-independent message interface that may, in some embodiments, allow file system components of disparate file systems to communicate efficiently and effectively. Also, in some embodiments, the use of a file system-independent message interface may ease the process of including support for new or future file system functions or storage paradigms.

In one embodiment, file system 130 may not know that the requested file resides on physical storage 220 and naming component 140 may provide that information to file system 130 as part of this name resolution function. In other embodiments, file system 130 may include the entire file I/O request in the message sent to naming component, possibly through messaging component 150A, and naming component may then translate the file name into a physical location where the data for that file resides and may then send a message to data access component 160 including the data location and also including the requested file I/O, according to one embodiment. Thus, in one embodiment; naming component 140 may provide name resolution information to file system 130 and file system 130 may then send a message to data access component 160 for actual data reading or writing. In another embodiment, though, naming component 140 may send the message to data access component 160 and not send a response to file system 130 until data access component 160 has read the requested data from the location specified by naming component 140.

While FIG. 1 illustrates, according to one embodiment, a message based file system using only two file system components, naming component 140 and data access component 160, other embodiments may use more and different file systems components when implementing message based file system. In general, the number of file system components included in a message based file system may vary from embodiment to embodiments and in some embodiments, file system components may be dynamically added or removed from a message based file system without stopping or restarting the file system. Thus, host 100 may, in one embodiment not illustrated by FIG. 1, include only one messaging component 150 that both naming component 140 and data access component 160 may use to communicate with each other.

According to some embodiments, file system-independent messaging, as described herein, may facilitate the distribution of any file system. For example, in one embodiment, a messaging library that communicates according to a file system-independent message interface may be provided and may allow an existing file system to be compartmentalized for distribution on one or more devices and thus the functionality of the existing file system may be included in a message based file system. Alternatively, in another embodiment, an existing file system may be compartmentalized for distribution and file system-independent messaging capabilities may be included in each resulting file system component without using a separate message library. By communicating according to a file system-independent message interface, a message based file system may, in some embodiments, implement a file system including file system components from different vendors and may mix and match file system component from the different vendors if all the components are configured to component according to the same file system independent message interface.

File systems components may communicate with a messaging component using any of a number of different communication mechanisms, according to various embodiments. For example, in one embodiment, messaging component 150 may expose an API including one or more functions that naming component 140 may call to communicate with other file system components. In another embodiment, naming component 140 may use a shared memory feature of host 100 to communicate with messaging component 150. In yet another embodiment, messaging component 150 may be linked into naming component 140 as a separate code module, while in other embodiments, messaging component 150 may be a separate dynamic library that naming component 140 loads during execution. Thus, there are many different ways for file system components to communicate with message components.

Figure 2:
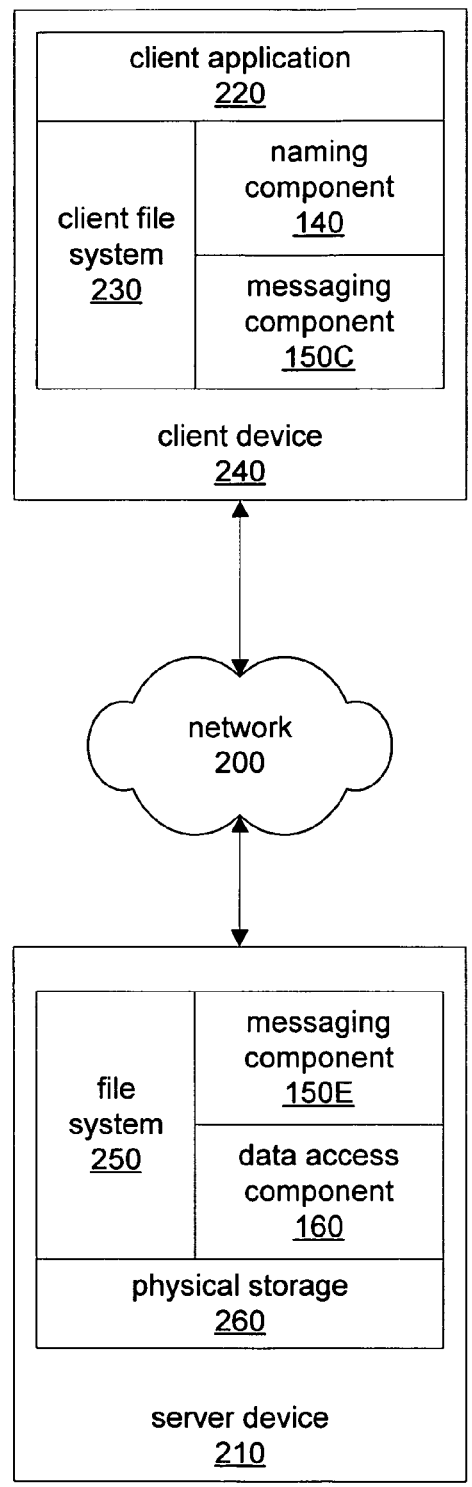
FIG. 2 is a block diagram illustrating one embodiment of a message based file system distributed across multiple devices.

FIG. 2 is a block diagram illustrating one embodiment of a message based file system including a client device and a server device. In such an embodiment, the message based file system is distributed across multiple devices communicating over network 200. For example, client application 220 on client device 240 may want to read data from a file through client file system 230. In one embodiment, client file system 230 may include naming component 140 and messaging component 150C and together with file system 250 on server device 210, which may include data access component 160 and messaging component 150E, may implement a message based file system.

Thus, in response to client application 220's file read request, client file system 230 may first use naming component 140 to resolve the requested file's name to a physical storage location, and may also communicate with data access component 160 of file system 250 on server device 210 to read the data from physical storage 260, according to one embodiment. In one embodiment, client file system may use messaging component 150C to communicate with naming component 140 and may also use messaging component 150C to communicate with data access component 160 on server device 210 through messaging component 150E. In another embodiment, client file system 230 may communicate directly with naming component 140, but may use messaging component 150C to communicate across network 200 to data access component 160.

In certain embodiments, client file system 230 may represent a sort of master file system component for client device 240 and may manage the use of other file system components on the same device. Likewise, in such an embodiment, file system 250 may be a master file system component for server device 210, managing other file system components on the same device. For example, client application 220 may issue a file read request to client file system 230 and file system 230 may communicate with naming component 140 for name resolution and may also use messaging component 150C to retrieve the data from physical storage 260 on server device 210. In one embodiment, messaging component 150C on client device 240 may communicate with messaging component 150E on server device 210. In such an embodiment, messaging component 150E on server device 210 may receive a message from message component 150C and communicate with file system 250 and file system 250 may then interact directly with data access component 160 to read data from physical storage 260. In another embodiment however, messaging component 150E may, after receiving a message from messaging component 150C interact directly with data access component 160 to read the requested data from physical storage 260. Thus, according to different embodiments, each file system component may communicate directly with individual file system components on other devices or may communicate with a master file system component that will then interact with other file system components that each may perform a smaller sub-function for the master file system component.

Network 200, as illustrated in FIG. 2, may comprise any of various network technologies according to various embodiments. Network 200 may be a local area network, wide area network, intranet network, Internet network, peer-to-peer network, or many other types of network. Network 200 may be designed to be continuously available (although network outages may occur), or may be intermittent (e.g. a modem connection made between a computer system in a user's home and a computer system in a user's workplace). Network 200 may utilize any of a number of different physical networking technologies including, but not limited to, Fiber Channel, Ethernet, Fast-Ethernet, Gigabit-Ethernet, Myrinet, Infiniband, VAX CI, or ServerNet, or others. Network 200 may be configured according to a number of different network topologies including, but not limited to, star, token-ring, token-bus, scatternet, dual-ring, mesh, etc.

Network 200 may also be configured to utilize a combination of different networking technologies and/or topologies. Additionally, Network 200 may comprise shared storage or shared memory for communicating between different computer systems or between processes within the same computer system, according to some embodiments. In some embodiments, Network 200 may be the interconnect network for any of various distributed shared storage environments, including, but not limited to, network file system (NFS), common Internet file system (CIFS), storage area network (SAN), network attached storage (NAS), storage-network aggregation, multi-site block storage, object-based storage devices (OBSD), or other asymmetric, out-of-band, or shared storage models.

When a message based file system is distributed across multiple devices, as illustrated in FIG. 2, various file systems components may reside on different devices. For example, naming component 150C may reside on client device 200 as part of client file system 230 and data access component 160 may reside on server device 210, according to one embodiment. The specific file system components and devices illustrated in FIG. 2 are intended only as a single example to simplify explanation. Message based file system may include many more devices and file system components than illustrated by FIG. 2, according to various embodiments. In some embodiments, a file system component on one device, such as naming component 140 on client device 240 may communicate with a file system component on another device such as data access component 160 on server device 210. In one embodiment, naming component 140 may communicate directly with data access component 160, while in other embodiments, naming component 140 may communicate with data access component 160 through messaging components, such as messaging components 150. When using messaging components, naming component 140 may interact with messaging component 150C that may in turn communicate with messaging component 150E, according to one embodiment.

Thus, the functions performed by naming component 140 and data access component 160 which were performed on a single device in the embodiment illustrated in FIG. 1 may be distributed across two devices, namely client device 240 and server device 210 in the embodiment illustrated by FIG. 2. In other embodiments, additional file system functions, such as encryption/decryption, authentication, etc. may be performed by additional file system components execution on additional devices.

The exact mechanism used within a message based file system for communication between messaging components or between file system components may vary from embodiment to embodiment and may also vary depending upon the underlying nature of network 200. For example, in one embodiment, network 200 may be the Internet and messaging component 150C may send a TCP/IP message across network 200 to messaging component 150E. In another embodiment, messaging component 150C may utilize a remote procedure call to communicate with messaging component 150E.

In certain embodiments, additional file system components may be dynamically added to a message based file system or existing file system components may be dynamically removed from the file system during execution without stopping and restarted the message based file system. In one embodiment, the exact number and location of the various file system components may not be determined until execution. The methods and mechanisms used by file system components to determine other file system components available in the message based file system may vary from embodiment to embodiment. For example, in one embodiment, the file system components may use a peer-2-peer communication mechanism to discover each other. In another embodiment a single mail file systems component may maintain information about the various file system components available in the message based file system and may provide that information to other file system components. The exact nature of the various mechanisms that may be employed to discover or address the various file system components of a message based file system are well understood in the field of network communication and are not discussed herein.

Figure 3:
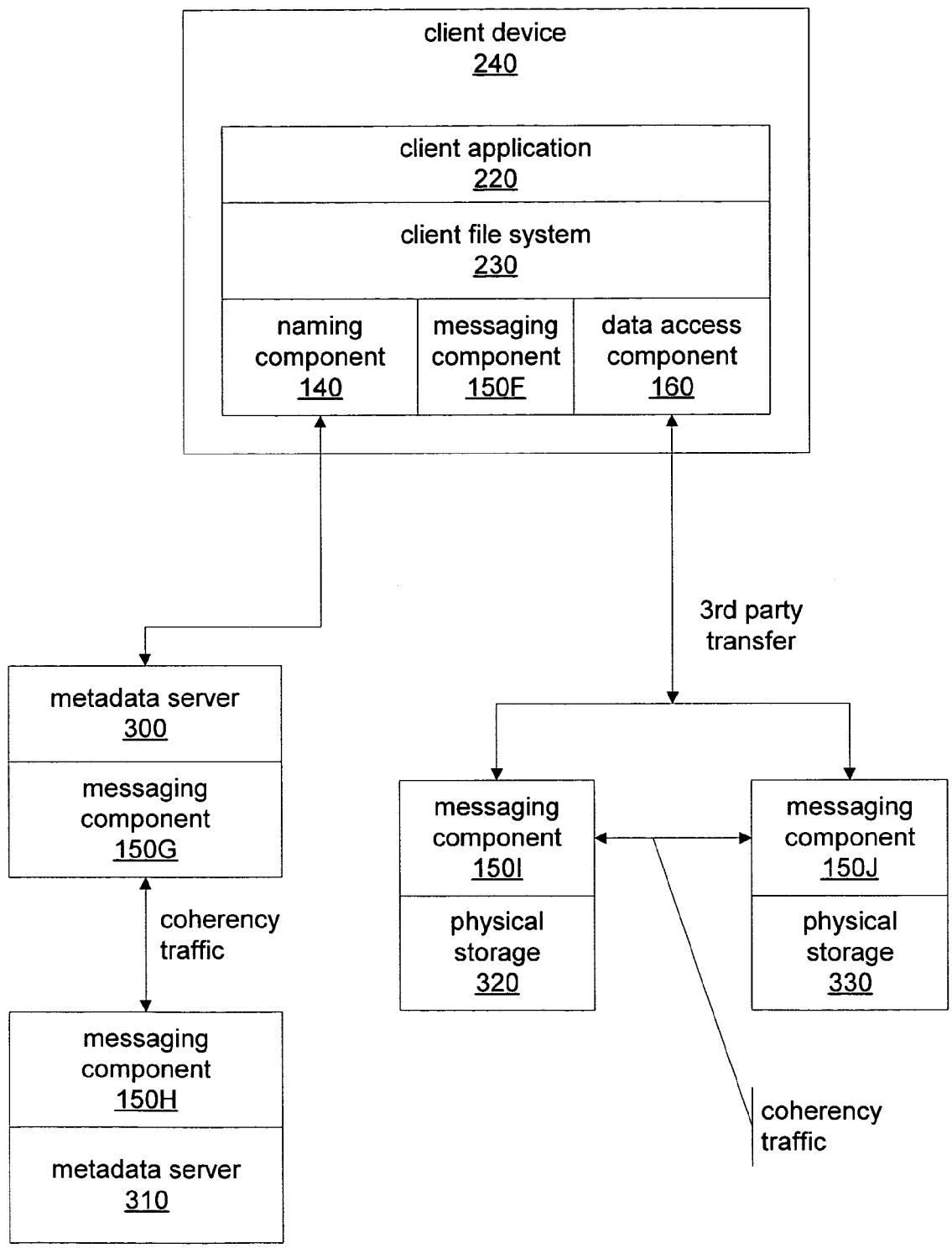
FIG. 3 is a block diagram illustrating a message based file system including multiple distributed file system components, according to one embodiment.

FIG. 3 is a block diagram illustrating a message based file system including multiple distributed file system components, according to one embodiment. In some embodiments, file system components executing on one device may communicate with file system components on other device in order to perform their respective functions of a message based file system. For example, even through client file system 230 on client device 240 may include naming component 140 and data access component 160, the actual naming and data access function may be performed by file system components executing on other devices. For instance, in response to a file write request from client application 220, client file system 230 may request naming resolution from naming component 140. In turn, naming component may communicate with metadata server 300 to load the metadata for the requested file.

Thus, in some embodiments, file system components executing on one device, such as naming component 140, may utilize file system components executing on other devices, such as metadata server 300, executing on other devices. In some embodiments, metadata server 300 may also communicate with yet other file system components on yet other devices regarding a file I/O request. For example, metadata server 300 may also communicate with metadata server 310, or perhaps another metadata server, through messaging components, such as messaging components 150G and 150H, to ensure data coherency across multiple metadata servers.

Similarly, data access component 160 may communicate with messaging component 150I and/or messaging component 150J for access to data on physical storage 320 or 330 respectfully. In one embodiment, physical storage 330 and physical storage 320 may be mirrored systems and messaging components 150I and 150J may communicate to ensure that changes to one storage system, such as physical storage 320, are reflected or copied to the other, such as physical storage 330.

In one embodiment, as illustrated by FIG. 3, client file system 230 may include a single messaging component 150F that performs all the communication necessary between various file system components. In other embodiments, client file system 230 may include a separate messaging component for each file system component and may even include a separate messaging component to communicate with file system components on other devices. Thus in one embodiment naming component 140 may use messaging component 150F to communicate with both data access component 160 and metadata server 300, while in another embodiment, naming component 140 may use messaging component 150F only to communicate data access component 160 and my use a different messaging component not illustrated in FIG. 3, to communicate with metadata server 300.

Figure 4:
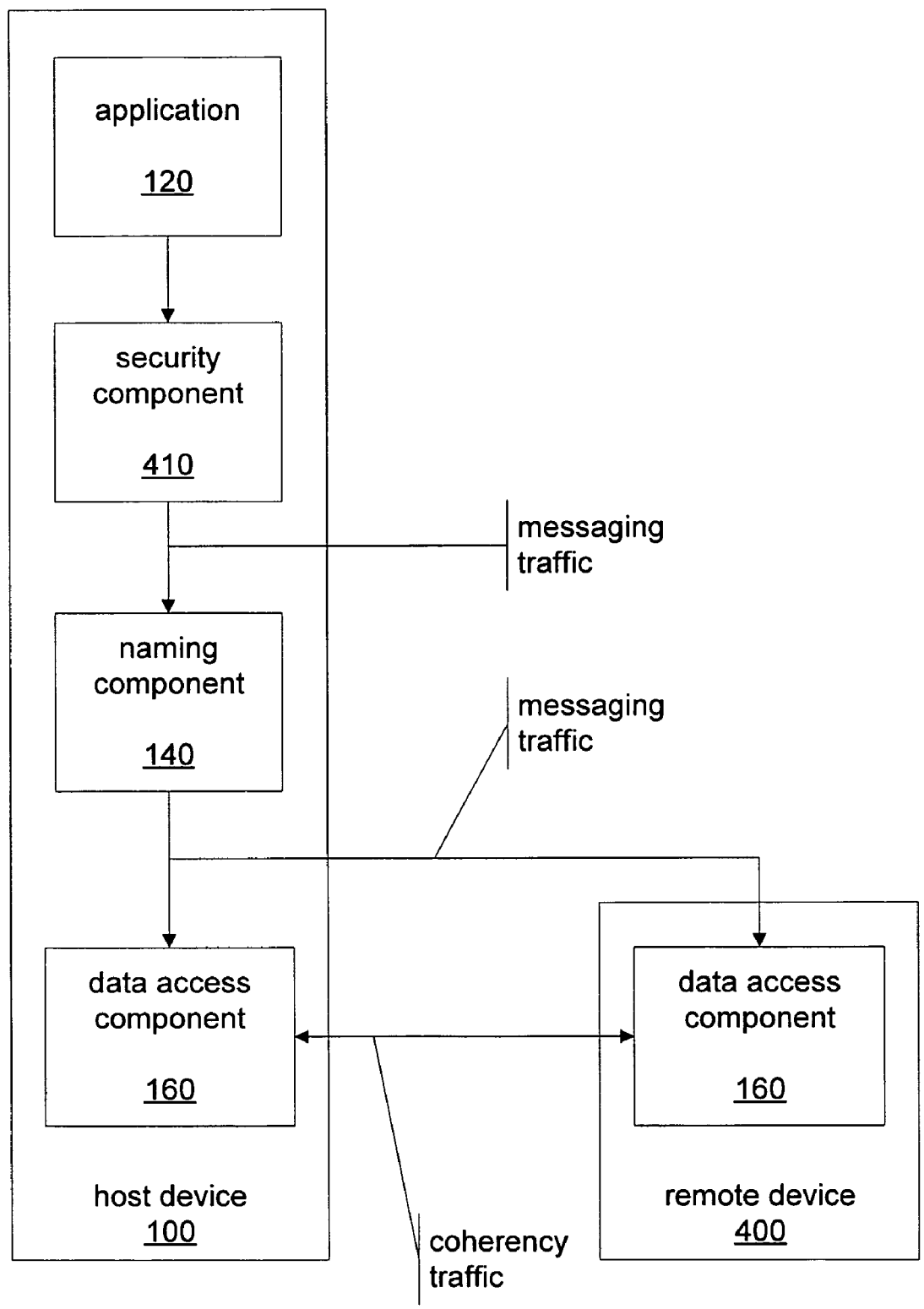
FIG. 4 is a block diagram illustrating a message based file system including a file system component duplicated across multiple devices.

FIG. 4 is a block diagram illustrating one embodiment of a message based file system including duplication of file system components on multiple devices. As illustrated in FIG. 4, a message based file system may include duplicate file system components on multiple devices. For example, a message based file system may be implement across host device 100, and remote device 400, according to one embodiment. In such an embodiment, host device 100 may include various file system components, such as security component 410, naming component 140, and data access component 160. Additionally, the message based file system illustrated in FIG. 4 may also include data access component 160 on remote device 400.

Both instances of data access component 160 may perform the same data access functions to the same physical storage system, such as physical storage 310, according to certain embodiments. In other embodiments, each instance of data access component 160 may provide data access functionality to two separate, but mirrored storage systems, thus providing naming component 140 an option of which instance of data access component 160 to when requesting data access functionality, according to some embodiments. For example, in one embodiment, naming component 140 could use the remote instance of data access component 160 in order to free up host device 100 for other processes. In other embodiments, the two instances of data access component 160 may be configured to communicate with each other for coherency or other data replication purposes. In general, file system components may be duplicated across multiple devices for various reasons according to different embodiments.

As described above, in some embodiments, the file system components on both host device 100, and remote device 400 may also include various messaging components not shown in FIG. 4.

Figure 5:
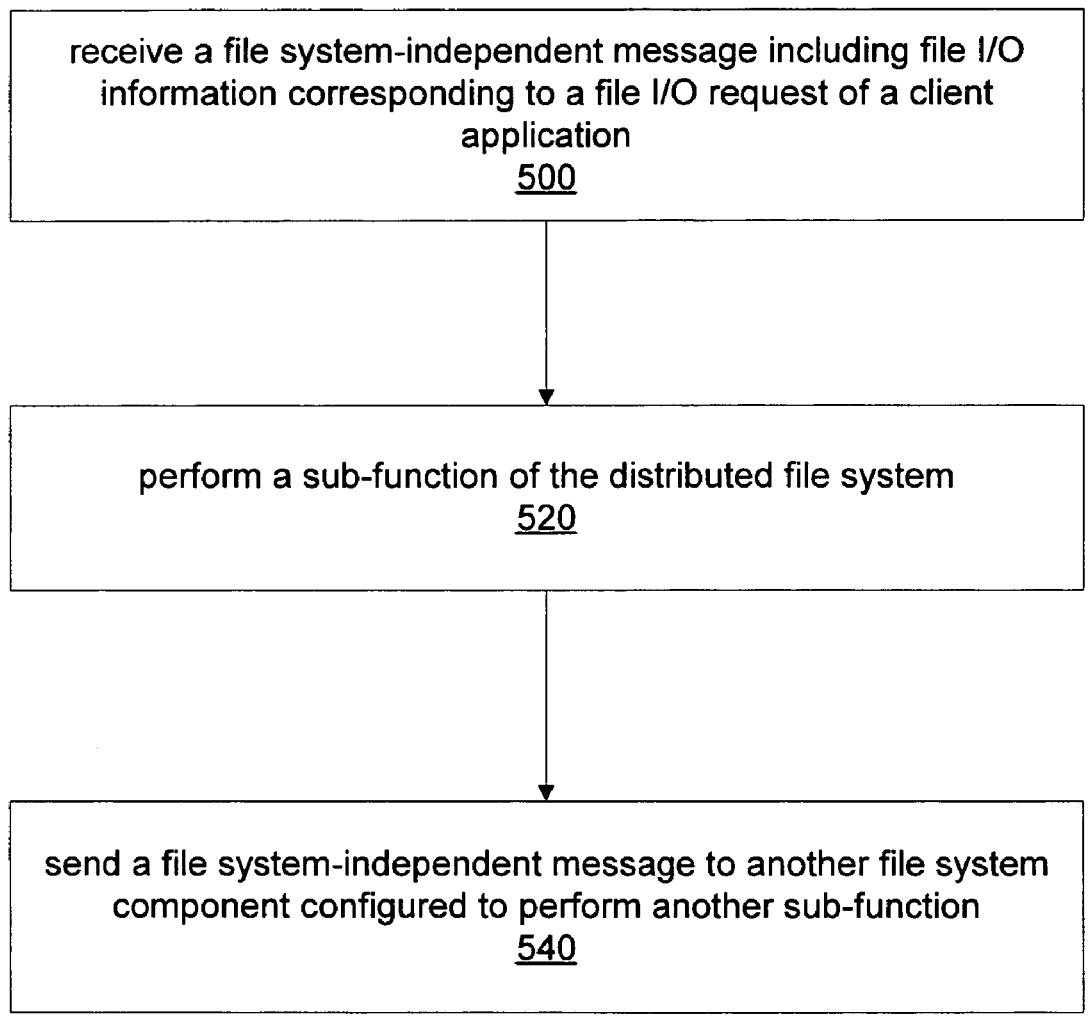
FIG. 5 is a flowchart illustrating one embodiment of a method for implementing a message based file system.

FIG. 5 is a flowchart illustrating one embodiment of a method for implementing a message based file system. A file system component, such as naming component 140, of a message based file system may receive a file system-independent message including I/O information corresponding to a file I/O request of a client application as illustrated by block 500, according to one embodiment. For example, application 120 may desire to read a file and may make a corresponding file I/O request to message based file system 130. File system 130 may in turn send a message, according to a file system-independent message interface, to naming component 140 including information regarding the file I/O request such a the file name and path, and what sections of the file to read. A file component may also perform a sub-function of the distributed file system as illustrated by block 520, in one embodiment. Thus, after receiving a message regarding application 120's file I/O request, naming component 140 may perform a sub-function, such as resolving the file name and path to a physical storage location where data for that file may be found.

A message based file system may, in some embodiments, be distributed even if all the file system components of the file system execute on a single device. For example, the file system may be distributed because different components perform different functions of the file system and file system-independent messages may be used to communicate between them. Additionally, in one embodiment, a file system component may send a file system-independent message to another file system component configured to perform another sub-function, as illustrated by block 540. For instance, after resolving the requested filename and offset to physical storage locations, naming component 140 may send a message to data access component 160 and data access component 160 may perform the actual reading of the data from the physical locations provided by naming component 140. As described above, file system components may communicate with each other directly, or may use one or more messaging components configured to communicate with each other, according to various embodiments. Additionally, file system components may reside on the same physical device or may execute on separate devices, in different embodiments.

Figure 6:
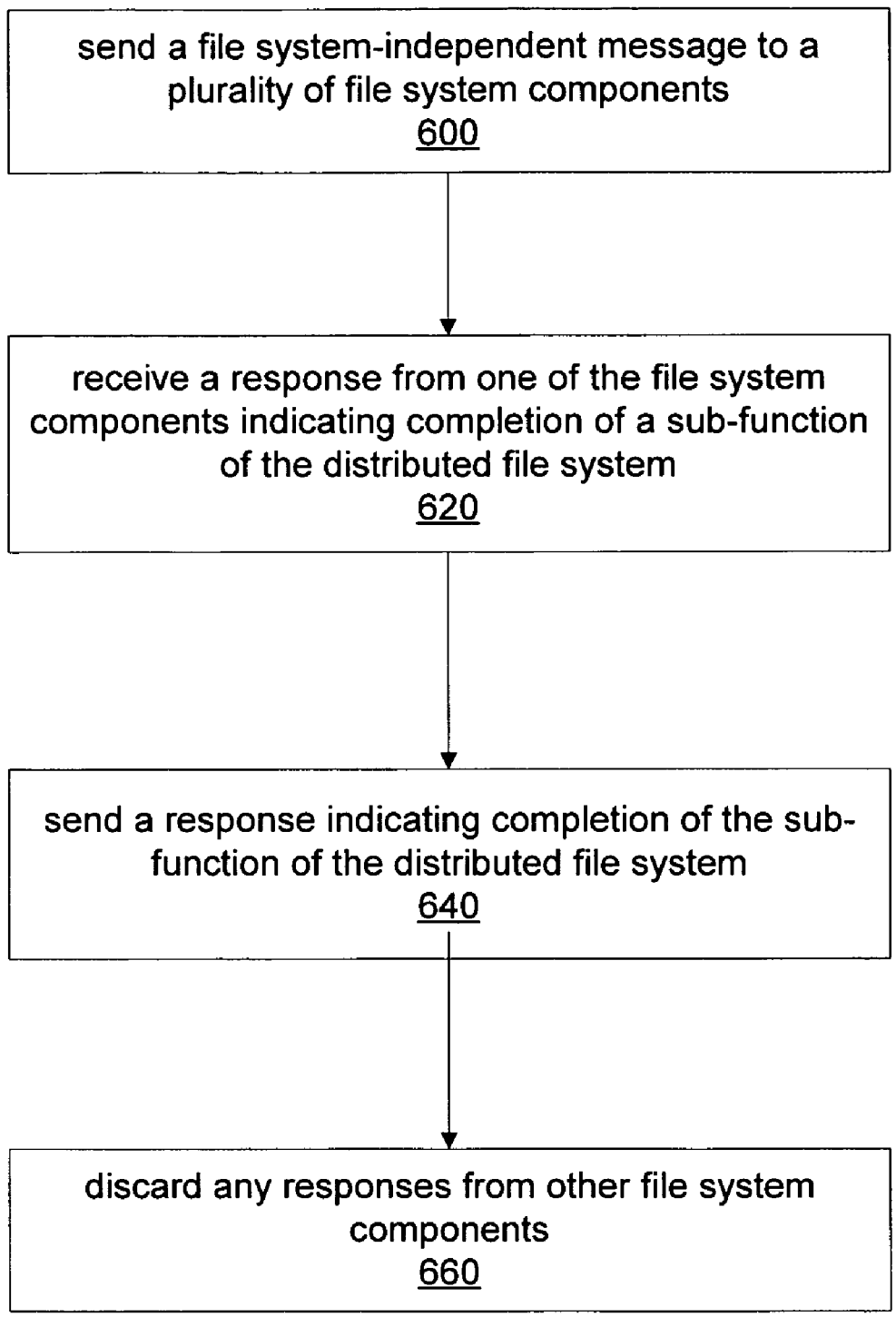
FIG. 6 is a flowchart illustrating one embodiment of a method for implementing a message based file system using multiple file system components for a single file system function.

FIG. 6 is a flowchart illustrating one embodiment of a method for implementing a message based file system. In some embodiments, multiple file system components may be configured to perform the same sub-function of the message based file system, such as a file system that include mirrored data or multiple metadata servers each configured to provide metadata for the same set of files. In such an embodiment, a file system component may send a file system-independent message to a plurality of file system components as illustrated by block 600 and may then receive a response from one of the file system components indicating completion of a sub-function of the distributed file system, as illustrated by block 620. For example, naming component 140 may send a file system-independent message to data access component 160 through messaging component 150F, as illustrated in FIG. 3, and data access component 160 may send a file system-independent message to both messaging components 150I and 150J to read data from mirrored physical storage 320 and 330, according to one embodiment. Thus, since the same data may be read from either physical storage 320 or physical storage 330, and since one of the physical storage systems may already be in use, or may be slower than the other, data access component 160 may send a file system-independent message requesting the data to both of them, in one embodiment.

Additionally in such an embodiment, data access component 160 may receive a response including the requested data from one of the physical storage systems before receiving a response from the other. After receiving a response from one of the file system components, the first file system component may send a response including completion of the sub-function of the distributed file system, as illustrated by block 640. Thus, data access component 160, after receiving a response from physical storage 320, may send a response back to naming component 140 including the requested data or other information indicating the completion of the data read, in one embodiment. The information indicating the completion of a sub-function of the distributed file system may indicate the success or failure of the sub-function, according to various embodiments. After sending a response indicating the completion of the sub-function, the file system component may discard any responses from other file system components as illustrated by block 660. For example, data access component 160 may, after receiving a response from messaging component 150I including data from physical storage 320, ignore or discard a response from messaging component 150J.

Figure 7:
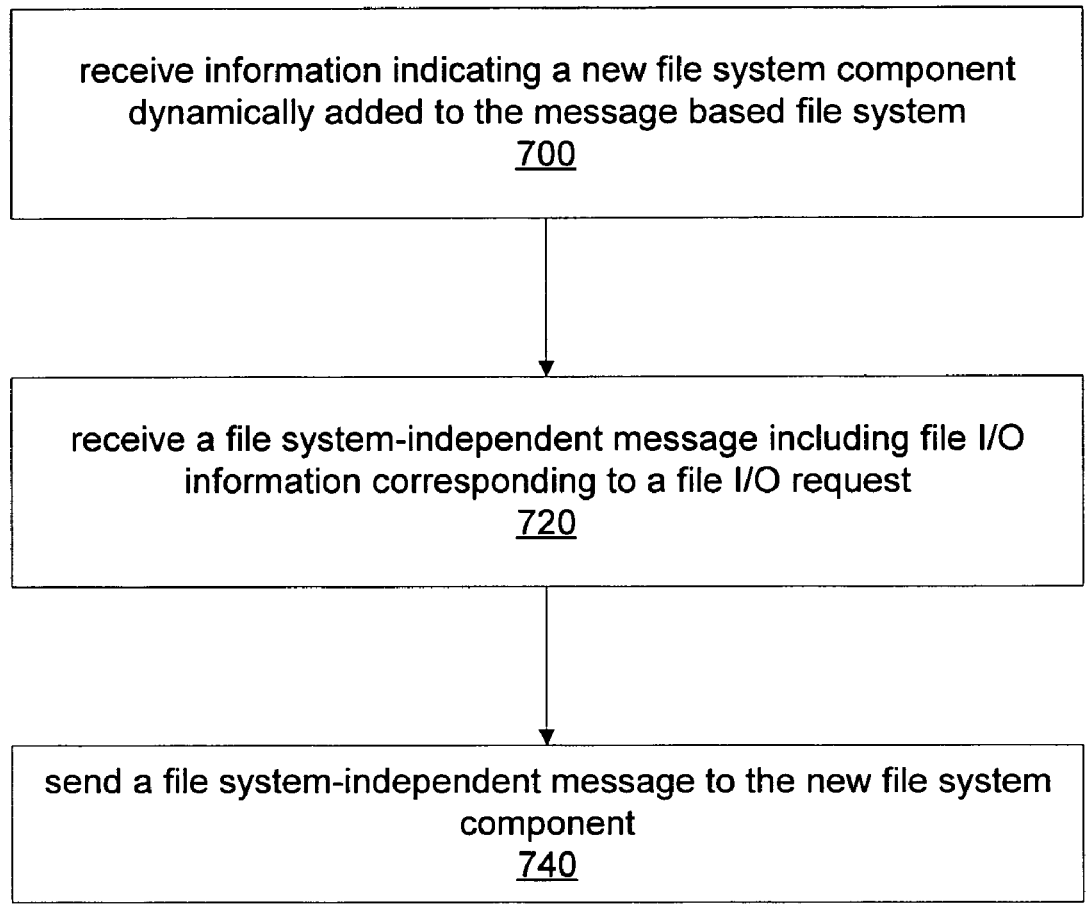
FIG. 7 is a flowchart illustrating one embodiment of a method for including dynamically added file systems components to a message based file system.

FIG. 7 is a flowchart illustrating one embodiment of a method for including dynamically added file systems components to a message based file system. In some embodiments, file system components may be dynamically added to a message based file system and existing file system components may be configured to recognize the new, dynamically added file systems components and send messages to them. Thus, a file system component may receive information indicating a new file system component dynamically added to the distributed file system, as illustrated by block 700. For example, in one embodiment, naming component 140 may only know about one metadata server, such as metadata server 300 illustrated in FIG. 3 and may receive information indicating a new metadata server available in the message based file system, such as metadata server 310. Additionally, a file system component may also receive a file system-independent message including file I/O information corresponding to a file I/O request as illustrated by bock 720. A file system component may then send a message to the new file system component as illustrated by block 740, according to certain embodiments. In such an embodiment, naming component 140 may, after receiving information that indicating metadata server 310 is available in the distributed file system, send messages to metadata server 310 through the file system-independent message interface to get metadata for files of the file system.

Since, according to some embodiments, the various file systems components of a message based file system may communicate according to a file system-independent message interface, a file system component may successfully communicate with a newly added file system component using the same file system-independent message interface. Thus, in various embodiments, existing file system components may not need to be modified to work with newly added file system components because all of the file system components, both new and existing, may communicate through the file system-independent message interface. Thus, a message based file systems, in some embodiments, may include various "pluggable" file system components, able to be dynamically included in the message based file system.

The exact manner in which a file system component, such as naming component 140 may receive information indicating a new file system component may vary from embodiment to embodiment. For example, in one embodiment, a new, dynamically added file system component, such as metadata server 310, may announce its presence in the message based file system by broadcasting a message to all other file system components. Alternatively, in another embodiment, metadata server 310 may register-itself with a file system component configured to maintain information on all active file system components of the file system and that registry component may be configured to inform other file system components regarding the availability of metadata server 310. In one embodiment, naming component 140 may be configured to periodically query such a registry component to determine if any file system components have been added to the file system.

Figure 8:
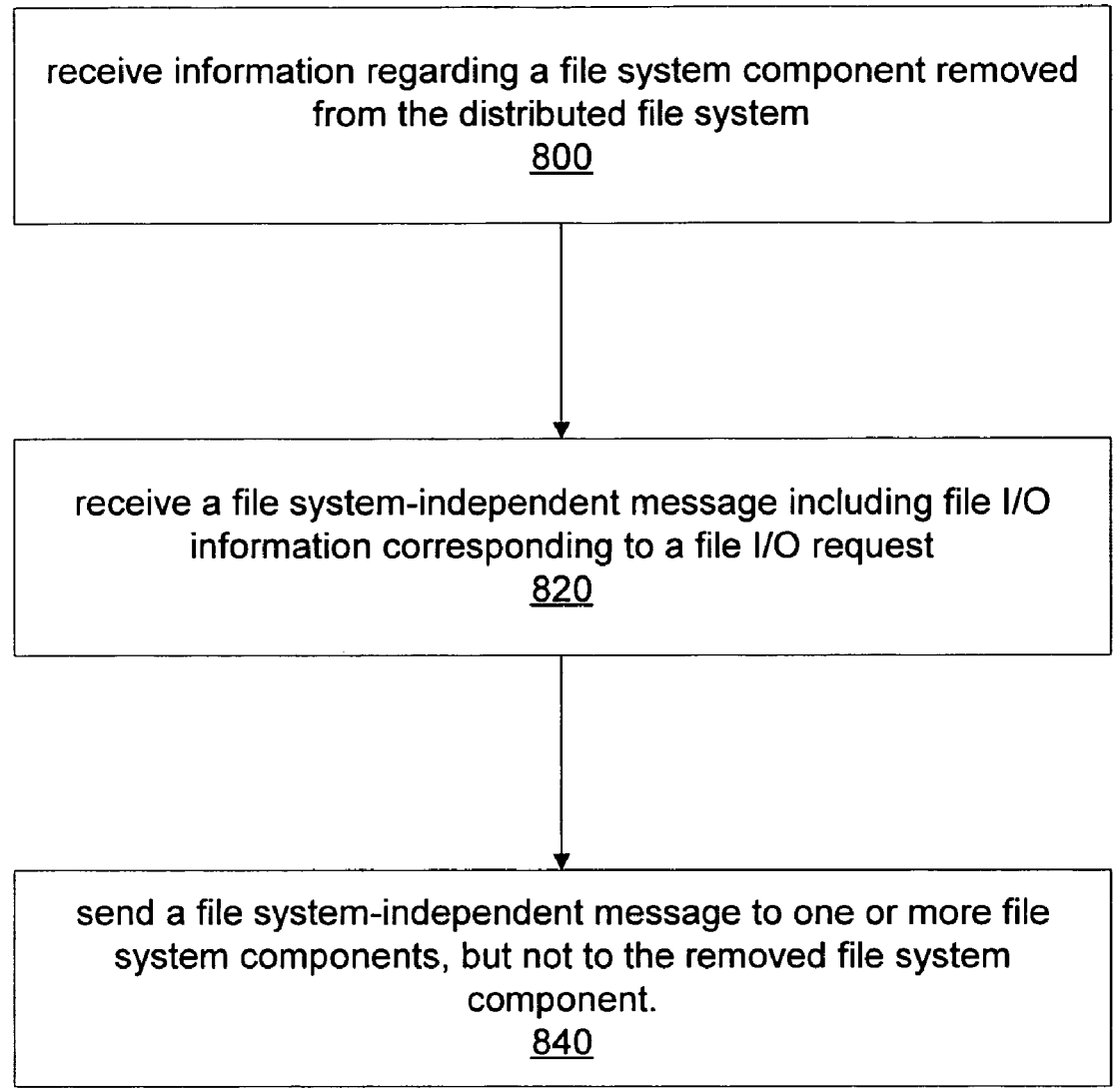
FIG. 8 is a flowchart illustrating one embodiment of a method for dynamically removing a file system component from a message based file system.

FIG. 8 is a flowchart illustrating one embodiment of a method for dynamically removing a file system component from a message based file system. Message based file systems may be implemented such that file system components may be dynamically removed from the file system, in some embodiments. File system components may be removed for various reasons, according to different embodiments. For example, in one embodiment, a file system component responsible for physical storage may be configured to remove itself periodically for backup purposes or for data integrity checks. In another embodiment, a file system component that can no longer be communicated with, perhaps due to a network failure, may be removed from the file system. Thus, a file system component may receive information regarding a file system component removed from the distributed file system, as illustrated by block 800. In one embodiment, for example, a file system component may keep track of the various other file system components and may, after receiving information that one of the file system components is no longer available in the message based file system, either delete the remove file system component from its list, or may mark the file system component as unavailable, according to different embodiments.

After receiving information regarding a removed file system component, the file system component may also receive a file system independent message including file I/O information corresponding to a file I/O request, as illustrated by block 820. Additionally the file system component may send a file system-independent message to one or more file system components, but may not send one to the removed file system component, as illustrated by block 840. For example, in one embodiment, naming component 140 may receive information indicating that metadata server 310 is no longer performing metadata services in the message based file system. In such an embodiment, naming component 140 may then not send messages requesting metadata to metadata server 310.

In certain embodiments, a file system component may be temporarily removed from the message based file system and may be added to the message based file system again at a later time. A file system component may be removed from a message based file system without removing the software from the device on which it is executing and without physically removing the device from the network, according to some embodiments. In such an embodiment, a file system component may simply be unavailable and may be made available by adding to back into the message based file system. A file system component may be temporarily removed from a message based file system for a number of reasons, such as bandwidth limitations, network connectivity failures, automatic software maintenance, or for upgrading the file system component, according to different embodiments.

As with the dynamic addition of file system components, described above regarding FIG. 7, the use of a file system-independent message interface may, in some embodiments, make the dynamic removal of file system components easy and efficient. For example, using a file system-independent message interface may allow file system component software to be upgraded without shutting down the entire message based file system, in some embodiments. For example, a new version of a file system component may first be added to the message based file system and the older version may then be removed from the message based file system, in some embodiments, both the addition and removal may be completely performed through the file system-independent message interface.

The exact manner in which a file system component receives information indicating that another file system component has been removed from the message based file-system may vary from embodiment to embodiment. As with the dynamic addition of file system components described above regarding FIG. 7, the dynamic removal of file system components may implement through various communication mechanisms. For example, in one embodiment, a file system component may voluntarily remove itself by broadcasting information indicating that it will no longer be performing any sub-functions of the message based file system. In another embodiment, a registry of active file system components may by maintained by a registry component, the dynamic removal of a file system component may be recorded in such a registry and other file system components may be configured to periodically query the registry component to learn about any file system components no longer performing their respective sub-functions in the distributed file system.

Figure 9:
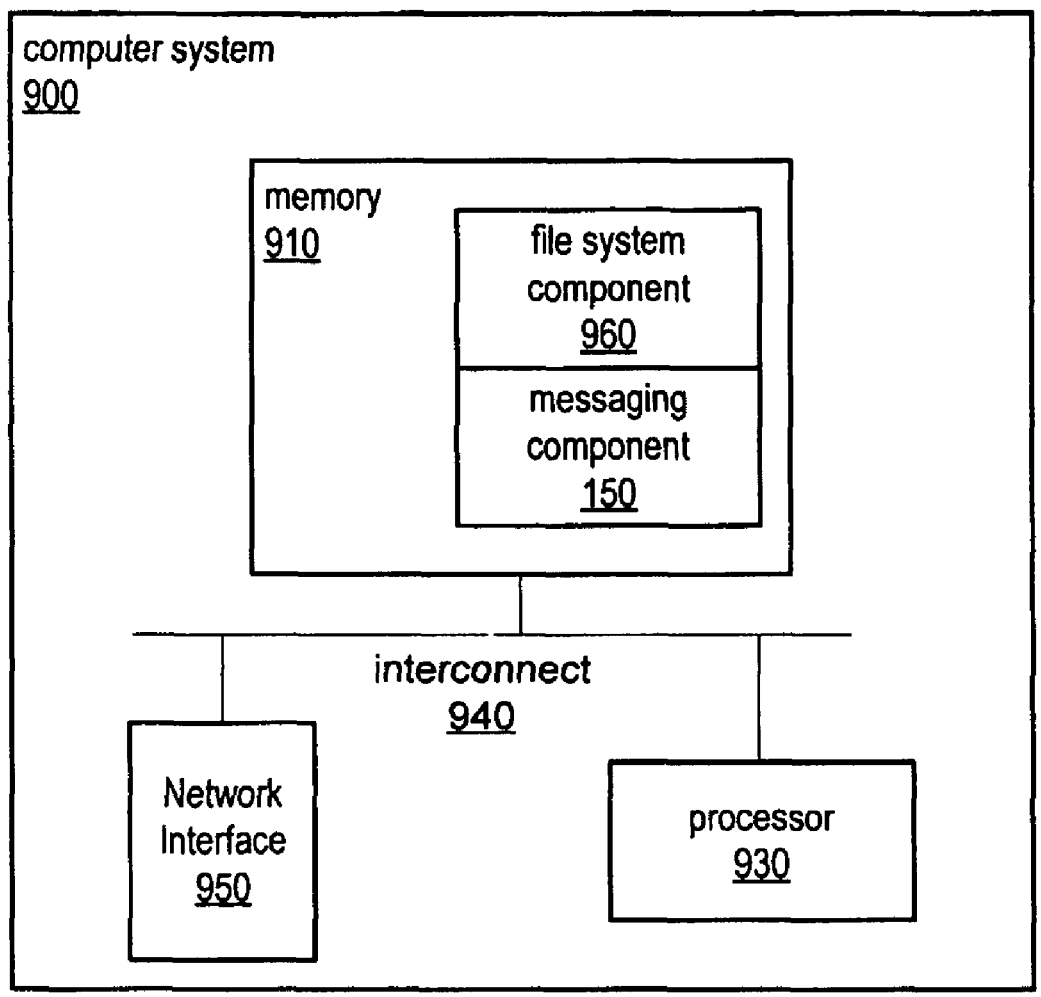
FIG. 9 is a block diagram illustrating a computer system suitable for implementing a message based file system.

FIG. 9 illustrates a computing system capable of implementing a message based file system as described herein and according to various embodiments. Computer system 900 may be any of various types of devices, including, but not limited to, a personal computer system, desktop computer, laptop or notebook computer, mainframe computer system, handheld computer, workstation, network computer, a consumer device, or any type of networkable peripheral device such as storage devices, switches, modems, routers, etc, or in general any type of networkable computing device. Computer system 900 may include at least one processor 930. Processor 930 may couple across interconnect 940 to memory 910.

Memory 910 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 910 may include program instructions configured to implement a message based file system, as described herein. In certain embodiments memory 910 may include program instructions configured to implement a file system component, such as file system component 960. In such embodiments, file system component 120 may be configured to perform a sub function of a distributed file system as described herein. In other embodiments, memory 910 may include program instructions configured to implement a messaging component, such as messaging component 150. In such embodiments, messaging component 150 may be configured to send and receive messages in a file system-independent message format with other messaging component and to communicate with file system components, as described herein.

In one embodiment, computer system 900 may be configured to communicate across network 200 through network interface 950. In some embodiments, file system component 960 or messaging component 150 may be configured to communicate through network interface 950 to send and receive messaging in a file system-independent message format with other file system components or other messaging components, as described herein.

Although the embodiments above have been described in detail, numerous variations and modifications will become apparent once the above disclosure is fully appreciated. It is intended that the following claims be interpreted to embrace all such variations and modifications.

What is claimed is:

1. A system for implementing a distributed file system, comprising:
    a plurality of devices, wherein each device comprises:
        a processor; and
        a memory coupled to the processor, wherein the memory comprises program instructions that are executable by the processor to implement one or more file system components and one or more messaging components that are distinct from said one or more file system components, wherein the one or more file system components are operable to fulfill file I/O requests from client applications that are external to the one or more file system components and external to the one or more messaging components;
    wherein for at least some of the file system components, different ones of said file system components are compatible with different file system standards, wherein said at least some of the file system components have different message interfaces specific to each file system component, wherein ones of the different message interfaces are compatible with different ones of the different file system standards such that said at least some file system components are incompatible to communicate with each other without use of said one or more messaging components;
    wherein each of the file system components is configured to:
        perform a sub-function of the distributed file system;
        communicate with at least one other file system component via one or more of the messaging components to fulfill a client application file I/O request;
    wherein one or more of the file system components are further configured to:
        send, via a given one of the one or more messaging components, a message to each of a plurality of file system components each configured to perform the same sub-function of the distributed file system, wherein the message comprises information regarding the client application file I/O request;
        receive, according to the given messaging component, a response from one of the plurality of file system components indicating completion of the sub-function; and
        subsequent to receiving the response, discard any further responses from others of the plurality of file system components;
    wherein to communicate with any given file system component, each of said file system components is configured to convey a message to said given file system component via one or more of the messaging components without invoking a remote procedure call or a direct function call exposed by said given file system component, such that any one of said file system components is operable to communicate with said given file system component without dependence on any message interface or any file system standard that is specific to said given file system component.

2. The system of claim 1, wherein one or more of the file system components are further configured to:
    receive a message from another file system component via the given messaging component;
    perform a sub-function of the distributed file system in response to said receiving; and
    send another message to another one or more file system component via the given messaging component, wherein the message comprises information regarding the client application file I/O request and further comprising information indicating the completion of the performed sub-function of the distributed file system.

3. The system of claim 2, wherein to send another message the one or more file system components are configured to send the another message to a file system component from which a message regarding the file I/O request was previously received.

4. The system of claim 2, wherein one or more of the file system components are further configured to:
    receive information indicating a new file system component dynamically added to the distributed file system, wherein the new file system component is configured to perform a sub-function of the distributed file system; and send the another message to the new file system component.

5. The system of claim 2, where one or more of the file system components are further configured to:

receive information regarding a removed file system component no longer configured to perform a sub-function of the distributed file system; and send a message to one or more file system components configured to perform the same sub-function as the removed file system component without sending a message to the removed file system component a message as part of said sending.

6. The system of claim 1, wherein to send a message via the given messaging component, the one or more file system components are configured to:

send the message to a file system component executing on a local device; and send the message to a file system component executing on a remote device.

7. The system of claim 1, wherein one or more of the file system components are further configured to:

in response to said receiving a response from one of the plurality of file system components, forward the received response to the file system component from which the message was received as part of said receiving.

8. The system of claim 1, wherein at least one of said file system components is configured to perform a naming sub-function of the distributed file system.

9. The system of claim 1, wherein at least one of said file system components is configured to perform a meta-data sub-function of the distributed file system.

10. The system of claim 1, wherein at least one of said file system components is configured to perform a mirroring sub-function of the distributed file system.

11. The system of claim 1, wherein at least one of said file system components is configured to perform a data replication sub-function of the distributed file system.

12. The system of claim 1, wherein at least one of said file system components is configured to perform a data-storage sub-function of the distributed file system.

13. The system of claim 1, wherein at least one of said file system components is configured to perform an authentication sub-function of the distributed file system.

14. The system of claim 1, where the given messaging component is configured to send and receive messages with other messaging components, and wherein each of the file system components is configured to communicate through the given messaging component.

15. The system of claim 14, wherein the given messaging component is further configured to receive a message including file I/O information regarding the client application file I/O request, and supply the file I/O information to a particular file system component.

16. The system of claim 15, wherein the particular file system component is configured to perform a sub-function of the distributed file systems in response to the given messaging component supplying the file I/O information and wherein the given messaging component is further configured to receive a response from the particular file system component indicating the completion of the sub-function.

17. The system of claim 16, wherein the given message component is further configured to send a notification message to another messaging component including information indicating the success or failure of the completed sub-function.

18. The system of claim 15, wherein as part of said supplying the given messaging component is further configured to translate the file I/O information into a file system specific format compatible with the particular file system component.

19. A computer-implemented method, comprising:

one or more computers performing:

receiving a message via one or more messaging components, wherein the message comprises file I/O information corresponding to a file I/O request of a client application, wherein the one or more messaging components are distinct from a plurality of file system components of a distributed file system, wherein the file system components are operable to fulfill file I/O requests from client applications that are external to the file system components and external to the one or more messaging components;

performing one of a plurality of sub-functions of a distributed file system for fulfilling the file I/O request, wherein the one of the plurality of sub-functions is performed according to the file I/O information of the received message;

a particular one of the file system components sending a second message via a given one of the one or more messaging components to a given one of the plurality of file system components of the distributed file system, wherein the file system component is configured to perform another sub-function of the distributed file system and wherein the second message includes information indicating a respective status of each of the plurality of sub-functions;

wherein for at least some of said file system components, different ones of said file system components are compatible with different file system standards, wherein said at least some of the file system components have different message interfaces specific to each file system component, wherein ones of the different message interfaces are compatible with different ones of the different file system standards such that said at least some file system components are incompatible to communicate with each other without use of said one or more messaging components; and wherein the particular file system component sending the second message to the given file system component comprises the particular file system component conveying a message to said given file system component via the given messaging component without invoking a remote procedure call or a direct function call exposed by said given file system component, such that the particular file system component is operable to communicate with said given file system component without dependence on any message interface or any file system standard that is specific to said given file system component.

20. The method of claim 19, wherein said sending comprises sending the second message to a file system component from which a message regarding the file I/O request was previously received.

21. The method of claim 19, wherein said sending comprises sending the second message to a plurality of additional file system components of the distributed file system each configured to perform respective sub-functions of the distributed file system.

22. The method of claim 21, wherein said sending comprises:
    sending the second message to a file system component executing on a local device; and
    sending the second message to a file system component executing on a remote device.

23. The method of claim 21, wherein all of the additional file system components are configured to perform the same respective sub-function of the distributed file system, further comprising:
    receiving a response from one of the additional file system components indicating completion of the respective sub-function; and
    discarding any responses from others of the additional file system components.

24. The method of claim 19, further comprising:
    receiving information indicating a new file system component dynamically added to the distributed file system, wherein the new file system component is configured to perform a sub-function of the distributed file system; and
    sending the second message to the new file system component via the given messaging component.

25. The method of claim 19, wherein said performing a sub-function comprises performing a naming function of the distributed file system.

26. The method of claim 19, wherein said performing a sub-function comprises performing a meta-data function of the distributed file system.

27. The method of claim 19, wherein said performing a sub-function comprises performing a data replication function of the distributed file system.

28. The method of claim 19, wherein said performing a sub-function comprises performing a data-storage function of the distributed file system.

29. The method of claim 19, wherein said performing a sub-function comprises performing an authentication function of the distributed file system.

30. The method of claim 19, further comprising the given messaging component sending and receiving messages with other messaging components each coupled to a respective file system component configured to perform a respective sub-function of the distributed file system.

31. The method of claim 30, further comprising:
    the given messaging component receiving a message including file I/O information regarding the client application file I/O request; and
    the given messaging component supplying the file I/O information to a particular file system component.

32. The method of claim 31, wherein said particular file system component performing a sub-function is performed in response to said supplying and further comprising the given message component receiving a response from the file systems component indicating the completion of the sub-function.

33. The method of claim 32, further comprising the given messaging component sending a notification message to another messaging component including information indicating the success or failure of the completed sub-function.

34. The method of claim 31, wherein said supplying comprises translating the I/O information into a file system specific format compatible with the particular file system component.

35. The method of claim 19, further comprising:
    receiving information indicating that a removed file system component is no longer configured to perform a sub-function of the distributed file system; and
    sending a message to one or more file system components configured to perform the same sub-function as the removed file system component without sending a message to the removed file system components as part of said sending.

36. A device, comprising:
    a processor; and
    a memory coupled to the processor, wherein the memory comprises program instructions executable by the processor to:
        receive a message via one or more messaging components, wherein the message comprises file I/O information corresponding to a file I/O request of a client application, wherein the one or more messaging components are distinct from a plurality of file system components of a message based file system, wherein the file system components are operable to fulfill file I/O requests from client applications that are external to the file system components and external to the one or more messaging components;
        perform a sub-function of the message based file system, according to the file I/O information of the received message;
        implement a particular one of the file system components sending a second message via a given one of the one or more messaging components to any given one of a plurality of file system components of the message based file system, wherein each of the file system components is configured to perform the same respective sub-function of the message based file system, wherein for at least some of said file system components, different ones of said file system components are compatible with different file system standards, and wherein said at least some of the file system components have different message interfaces specific to each file system component, wherein ones of the different message interfaces are compatible with different ones of the different file system standards such that said at least some file system components are incompatible to communicate with each other without use of said one or more messaging components;
        receive, via the given messaging component, a response from one of the plurality of file system components indicating completion of the respective sub-function; and
        subsequent to receiving the response, discard any further responses from others of the plurality of file system components;
    wherein to implement the particular file system component sending the second message to any given one of the file system components, the program instructions are further executable to implement the particular file system component conveying a message to said given file system component via the given messaging component without invoking a remote procedure call or a direct function call exposed by said given file system component, such that the particular file system component is operable to communicate with said given file system component without dependence on any message interface or any file system standard that is specific to said given file system component.

37. The device of claim 36, wherein to implement said sending the program instructions are configured to send the second message to a file system component from which a message regarding the file I/O request was previously received.

38. The device of claim 36, wherein to implement said sending the program instructions are configured to send the second message to a plurality of additional file system components of the message based file system each configured to perform respective sub-functions of the message based file system.

39. The device of claim 38, wherein to implement said sending the program instructions are configured to:
send the second message to a file system component executing on a local device; and
send the second message to a file system component executing on a remote device.

40. The device of claim 38, wherein the program instructions are further configured to:
receive information indicating that a removed file system component is no longer configured to perform a sub-function of the message based file system; and
send a message to one or more file system components configured to perform the same sub-function as the removed file system component without sending a message to the removed file system component as part of said sending.

41. The device of claim 36, wherein the program instructions are further configured to:
receive information indicating a new file system component dynamically added to the message based file system, wherein the new file system component is configured to perform a sub-function of the message based file system; and
send the second message to the new file system component via the given messaging component.

42. The device of claim 36, wherein to implement said performing a sub-function the program instructions are configured to perform a naming function of the message based file system.

43. The device of claim 36, wherein to implement said performing a sub-function the program instructions are configured to perform a meta-data function of the message based file system.

44. The device of claim 36, wherein to implement said performing a sub-function the program instructions are configured to perform a data replication function of the message based file system.

45. The device of claim 36, wherein to implement said performing a sub-function the program instructions are configured to perform a data-storage function of the message based file system.

46. The device of claim 36, wherein to implement said performing a sub-function the program instructions are configured to perform an authentication function of the message based file system.

47. The device of claim 36, wherein the given messaging component is configured to send and receive messages with other messaging components each coupled to a respective file system component configured to perform a sub-function of the message based file system.

48. The device of claim 47, wherein the program instructions are configured to receive the file I/O information corresponding to the file I/O request from the given messaging component, wherein the given messaging component is configured to receive the message including the file I/O information corresponding to the file I/O request of the client application.

49. The device of claim 48, wherein the program instructions are configured to:
perform the sub-function in response to receiving the file I/O information from the given messaging component; and
send an indication of the completion of the sub-function to the given messaging component.

50. The device of claim 49, wherein the given messaging component is configured to send a notification message to another messaging component.

51. The device of claim 48, wherein the program instructions are further configured to translate the I/O information from a file system-independent format into a file system specific format.

52. A computer accessible medium, comprising program instructions that are computer-executable to implement:
receiving a message via one or more messaging components, wherein the message comprises file I/O information corresponding to a file I/O request of a client application, wherein the one or more messaging components are distinct from a plurality of file system components of a distributed file system, wherein the file system components are operable to fulfill file I/O requests from client applications that are external to the file system components and external to the one or more messaging components;
performing one of a plurality of sub-functions of a message based file system for fulfilling the file I/O request, wherein the one of the plurality of sub-functions is performed according to the file I/O information of the received message; and
a particular one of the file system components sending a second message via a given one of the one or more messaging components to a given one of the plurality of file system components of the message based file system, wherein the file system component is configured to perform another sub-function of the message based file system and wherein the second message includes information indicating a respective status of each of the plurality of sub-functions;
wherein for at least some of said file system components, different ones of said file system components are compatible with different file system standards, wherein said at least some of the file system components have different message interfaces specific to each file system component wherein ones of the different message interfaces are compatible with different ones of the different file system standards such that said at least some file system components are incompatible to communicate with each other without use of said one or more messaging components; and
wherein the particular file system component sending the second message to the given file system component comprises the particular file system component conveying a message to said given file system component via the given messaging component without invoking a remote procedure call or a direct function call exposed by said given file system component, such that the particular file system component is operable to communicate with said given file system component without dependence on any message interface or any file system standard that is specific to said given file system component.

53. The medium of claim 52, wherein to implement said sending a second message the program instructions are configured to implement sending the second message to a file system component from which a message regarding the file I/O request was previously received.

54. The medium of claim 52, wherein to implement said sending a second message the program instructions are configured to implement sending the second message to a plurality of additional file system components of the message based file system each configured to perform respective sub-functions of the message based file system.

55. The medium of claim 54, wherein to implement said sending a second message the program instructions are further configured to implement:
   sending the second message to a file system component executing on a local device; and
   sending the second message to a file system component executing on a remote device.

56. The medium of claim 54, wherein all of the additional file system components are configured to perform the same respective sub-function of the message based file system, wherein the program instructions are further configured to implement:
   receiving a response from one of the additional file system components indicating completion of the respective sub-function; and
   discarding any responses from others of the additional file system components.

57. The medium of claim 52, wherein the program instructions are further configured to implement:
   receiving information indicating a new file system component dynamically added to the message based file system, wherein the new file system component is configured to perform a sub-function of the message based system; and
   sending the second message to the new file system component via the given messaging component.

58. The medium of claim 52, wherein to implement said performing a sub-function the program instructions are configured to implement performing a naming function of the message based file system.

59. The medium of claim 52, wherein to implement said performing a sub-function the program instructions are configured to implement performing a meta-data function of the message based file system.

60. The medium of claim 52, wherein to implement said performing a sub-function the program instructions are configured to implement performing a data replication function of the message based file system.

61. The medium of claim 52, wherein to implement said performing a sub-function the program instructions are configured to implement performing a data-storage function of the message based file system.

62. The medium of claim 52, wherein to implement said performing a sub-function the program instructions are configured to implement performing an authentication function of the message based file system.

63. The medium of claim 52, wherein the given messaging component is configured to send and receive messages with other message components each coupled to a respective file system component configured to perform a respective sub-function of the message based file system.

64. The medium of claim 63, wherein the program instructions are further configured to implement receiving the file I/O information corresponding to the file I/O request from the given messaging component, wherein the given messaging component is configured to receive the message including the file I/O information corresponding to the file I/O request of the client application.

65. The medium of claim 64, wherein the program instructions are configured to implement performing the sub-function in response to receiving the file I/O information from the given messaging component.

66. The medium of claim 65, wherein the given messaging component is configured to send a notification message to another messaging component.

67. The medium of claim 64, wherein the program instructions are further configured to implement translating the I/O information from a file system-independent format into a file system specific format.

68. The medium of claim 52, wherein the program instructions are further configured to implement:
   receiving information indicating that a removed file system component is no longer configured to perform a sub-function of the message based file system; and
   sending a message via the given messaging component to one or more file system components configured to perform the same sub-function as the removed file system component without sending a message to the removed file system component as part of said sending.

* * * * *